(12) United States Patent
Yang et al.

(10) Patent No.: US 10,917,822 B2
(45) Date of Patent: Feb. 9, 2021

(54) METHOD AND APPARATUS USED TO MANAGE LINKS

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/334,569

(22) PCT Filed: Sep. 22, 2016

(86) PCT No.: PCT/CN2016/099772
§ 371 (c)(1),
(2) Date: Mar. 19, 2019

(87) PCT Pub. No.: WO2018/053770
PCT Pub. Date: Mar. 29, 2018

(65) Prior Publication Data
US 2020/0128458 A1    Apr. 23, 2020

(51) Int. Cl.
*H04W 36/00* (2009.01)
*H04W 36/30* (2009.01)

(52) U.S. Cl.
CPC ..... *H04W 36/00837* (2018.08); *H04W 36/30* (2013.01)

(58) Field of Classification Search
None
See application file for complete search history.

(56) References Cited

U.S. PATENT DOCUMENTS

2010/0159932 A1* 6/2010 Park .................. H04W 36/28
455/436
2012/0157103 A1* 6/2012 Frenger ............ H04W 36/0055
455/437

(Continued)

FOREIGN PATENT DOCUMENTS

CN    101111076    1/2008
CN    101641986    2/2010

(Continued)

OTHER PUBLICATIONS

WIPO, ISR for PCT/CN2016/099772, Mar. 27, 2017.

(Continued)

*Primary Examiner* — Ernest G Tacsik
(74) *Attorney, Agent, or Firm* — Hodgson Russ LLP

(57) ABSTRACT

Provided in embodiments of the present application are a method and a device for managing a link. The method includes: receiving, by a first network device, a first link quality parameter sent by a second network device, wherein the first link quality parameter is used to indicate a link quality between a terminal device and the second network device, and the first network device provides a current service for the terminal device; and determining, by the first network device, whether a connection between the terminal device and the second network device is needed according to the first link quality parameter.

18 Claims, 4 Drawing Sheets

(56) References Cited

U.S. PATENT DOCUMENTS

| | | | |
|---|---|---|---|
| 2014/0086173 A1* | 3/2014 | Sadeghi | H04L 5/005 370/329 |
| 2014/0256328 A1* | 9/2014 | Li | H04L 5/0051 455/444 |
| 2015/0139010 A1 | 5/2015 | Jeong et al. | |
| 2016/0219484 A1 | 7/2016 | Bontu et al. | |
| 2016/0277987 A1* | 9/2016 | Chen | H04L 5/0085 |
| 2017/0311369 A1* | 10/2017 | Chiba | H04W 64/003 |
| 2018/0270730 A1* | 9/2018 | Martin | H04W 24/10 |

FOREIGN PATENT DOCUMENTS

| | | |
|---|---|---|
| CN | 103916919 | 7/2014 |
| CN | 105960772 | 9/2016 |
| EP | 1881721 | 1/2008 |
| WO | 2008116027 | 9/2008 |
| WO | 2014021761 | 2/2014 |
| WO | 2015100533 | 7/2015 |

OTHER PUBLICATIONS

LG Electronics, "Intra-Access System (E-UTRAN) Mobility for LTE Active State," 3GPP TSG RAN WG2 Meeting #50, R2-060107, Jan. 2006, 3 pages.

EPO, Office Action for EP Application No. 16916509.9, dated Jun. 17, 2019.

* cited by examiner

METHOD AND APPARATUS USED TO MANAGE LINKS

CROSS-REFERENCE TO RELATED APPLICATION

This application is a National Stage Entry of International Application No. PCT/CN2016/099772, filed on Sep. 22, 2016, the entire disclosure of which is incorporated herein by reference.

TECHNICAL FIELD

The present disclosure relates to communication technologies, and in particular to a method and device for managing a link in the communication technical field.

BACKGROUND

In the existing wireless communication systems, when a terminal device moves in a connected state, the terminal device first performs signal measurement according to the configuration of the original network device that is currently serving the terminal device, and report the measurements according to the conditions required by the original network device. After the original network device collects the measurement report result of the terminal device, it determines whether the terminal device needs to perform handover according to the measurement report result. If the handover is required, the original network device sends a handover request message to a target network device. After receiving the handover request message, the target network device sends to the terminal device the resources which are necessary for the handover such as random access resources by the original network device. After receiving the corresponding configuration messages, the terminal device establishes synchronization with the target network device and completes the handover.

The above method only considers the signal quality between the terminal device and the original network device, and the terminal device is required to report the measurement result after the signal measurement is completed, which results in wastes of the signaling overhead of the terminal device.

SUMMARY

Embodiments of the present disclosure provide a method and device for managing a link.

According to a first aspect, there is provided a method for managing a link, including:

receiving, by a first network device, a first link quality parameter sent by a second network device, wherein the first link quality parameter is used to indicate a link quality between a terminal device and the second network device, and the first network device provides a current service for the terminal device; and determining, by the first network device, whether a connection between the terminal device and the second network device is needed according to the first link quality parameter.

Specifically, the second network device may first measure the connection between the terminal device and the second network device, and determine a first link quality parameter between the terminal device and the second network device, and then send the first link quality parameter to the first network device. It should be understood that the second network device may send the first link quality parameter by using an interface between the first network device and the second network device, which is not limited by the embodiments of the present disclosure.

Therefore, in the method for managing a link according to an embodiment of the present disclosure, the first network device receives the first link quality parameter between the terminal device and the second network device that is sent by the second network device, and then the first network device determines whether the connection between the terminal device and the second network device is required according to the first link quality parameter. The method can accurately manage the link of the terminal device, thereby saving signaling overhead of the terminal device, and improving user experiences.

In a first possible implementation according to the first aspect, before determining, by the first network device, whether the connection between the terminal device and the second network device is needed according to the first link quality parameter, the method further includes:

obtaining, by the first network device, a second link quality parameter, wherein the second link quality parameter is used to indicate a link quality between the terminal device and the first network device;

determining, by the first network device, whether a connection between the terminal device and the second network device is needed according to the first link quality parameter, includes:

determining, by the first network device, whether the connection between the terminal device and the second network device is needed according to the first link quality parameter and the second link quality parameter.

Specifically, the first network device can obtain not only the link quality parameter (that is, the first link quality parameter) between the terminal device and the second network device, but also the link quality parameter (i.e., the second link quality parameter) between the terminal device and the first network device. The first network device determines whether the connection between the terminal device and the second network is needed by considering both the first link quality parameter and the second link quality parameter.

In a second possible implementation according to the first aspect, determining, by the first network device, whether the connection between the terminal device and the second network device is needed according to the first link quality parameter and the second link quality parameter, includes:

if the first link quality parameter is greater than a first threshold value, and the second link quality parameter is smaller than a second threshold value, determining, by the first network device, that the connection between the terminal device and the second network device is needed.

In a third possible implementation according to the first aspect, determining, by the first network device, whether the connection between the terminal device and the second network device is needed according to the first link quality parameter and the second link quality parameter, includes:

if the first link quality parameter is greater than a sum of the second link quality parameter and a third threshold value, determining, by the first network device, that the connection between the terminal device and the second network device is needed.

In a fourth possible implementation according to the first aspect, determining, by the first network device, whether the connection between the terminal device and the second network device is needed according to the first link quality parameter and the second link quality parameter, includes:

if the first link quality parameter is smaller than a fourth threshold value, and the second link quality parameter is greater than a fifth threshold value, determining, by the first network device, that the connection between the terminal device and the second network device is not needed.

As an alternative, if the first link quality parameter is smaller than the fourth threshold value, the first network device determines that the connection between the terminal device and the second network device is not needed.

As an alternative, if the second link quality parameter is greater than the fifth threshold value, the first network device determines that the connection between the terminal device and the second network device is not needed.

In a fifth possible implementation according to the first aspect, after determining whether the connection between the terminal device and the second network device is needed, the method further includes:

if it is determined that the connection between the terminal device and the second network device is needed, and there is no connection between the terminal device and the second network device, establishing, by the first network device, the connection between the terminal device and the second network device.

As an alternative, if the first network device determines that the connection between the terminal device and the second network device is needed, and the there currently exists a connection between the terminal device and the second network device, the first network device can take no actions or operations, and embodiments of the present disclosure does not impose specific limitations on this.

In a sixth possible implementation according to the first aspect, establishing, by the first network device, the connection between the terminal device and the second network device, includes:

adding, by the first network device, the connection between the terminal device and the second network device as an auxiliary connection of a link of the terminal device according to the first link quality parameter.

Specifically, the first network device may set the connection between the terminal device and the second network device as an auxiliary connection of a link of the terminal device. The first network device still serves as the primary connection of the second network device and provides services for the terminal device.

In a seventh possible implementation according to the first aspect, establishing, by the first network device, the connection between the terminal device and the second network device, includes:

switching, by the first network device, a link of the terminal device to the second network device according to the first link quality parameter.

Specifically, the first network device may directly switch the link of the terminal device to the second network device so that the second network device provides services for the terminal device.

In an eighth possible implementation according to the first aspect, after determining whether the connection between the terminal device and the second network device is needed, the method further includes:

if it is determined that the connection between the terminal device and the second network device is not needed, and there exists a connection between the terminal device and the second network device, deleting, by the first network device, the connection between the terminal device and the second network device.

It should be understood that the terminal device is currently served by the first network device. Therefore, if there is a connection between the terminal device and the second network device, the connection is necessarily an auxiliary connection of the link of the terminal device. After the first network device deletes the connection between the terminal device and the second network device, the connection of the terminal device is changed from a dual connection to a single connection, and only the first network device provides services for the terminal device.

Optionally, if the first network device determines that the connection between the terminal device and the second network device is not required, and there is no connection between the terminal device and the second network device, the first network device may not perform any operations, and the present disclosure does not impose specific limitations on this.

In a ninth possible implementation according to the first aspect, the first link quality parameter is at least one of the following parameters between the terminal device and the second network device:

a signal reception strength, a signal reception quality or a link loss.

In a tenth possible implementation according to the first aspect, before receiving, by the first network device, the first link quality parameter sent by the second network device, the method further includes:

sending, by the first network device, measurement configuration information to the second network device, wherein the measurement configuration information is used to instruct the second network device to measure the link quality between the terminal device and the second network device;

wherein receiving, by the first network device, the first link quality parameter sent by the second network device, includes:

receiving, by the first network device, a measurement result that is sent by the second network device according to the measurement configuration information, wherein the measurement result carries at least one of:

at least one first link quality parameter of a measured beam, a cell, a network transmission point, and frequency point information, and uplink transmission time reference information of the terminal device.

It should be understood that the first link quality information refers to link quality information corresponding to the measured beam, network transmission point, the cell, and the frequency point.

In an eleventh possible implementation according to the first aspect, the measurement configuration information includes at least one of:

the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

Further, the transmission time reference information of the terminal device may be advance of the transmission time.

It should be understood that the transmission time reference information of the terminal device refers to the transmission time reference information of the terminal on the corresponding network device link.

It should be understood that the first link quality parameter acquired by the first network device may be obtained by the second network device which measures the link quality between the terminal device and the second network device. The second network device may measure a link quality between the terminal device and the second network device by using a reference signal. The related parameters of the reference signal may be configured by the second network device, or may be configured by the first network device, which is not limited in embodiments of the present disclosure.

In a twelfth possible implementation according to the first aspect, before receiving, by the first network device, the first link quality parameter sent by the second network device, the method further includes:

sending, by the first network device, a request message to the second network device, wherein the request message is used to request the second network device to configure a reference signal for the terminal device;

receiving, by the first network device, a configuration parameter of the reference signal sent by the second network device; and sending, by the first network device, the configuration parameter to the terminal device.

In a thirteenth possible implementation according to the first aspect, before receiving, by the first network device, the first link quality parameter sent by the second network device, the method further includes:

sending, by the first network device, a configuration parameter of a reference signal of the terminal device to the second network device.

In a fourteenth possible implementation according to the first aspect, the configuration parameter includes at least one of:

a resource location occupied by transmitted reference signal, a signal codeword, beam information, a network transmission point, and a transmission power for transmitting the reference signal.

According to a second aspect of the present disclosure, there is provided method for managing a link, including:

determining, by a second network device, a first link quality parameter, wherein the first link quality parameter is used to indicate a link quality between a terminal device and the second network device; and sending, by the second network device, the first link quality parameter to a first network device, wherein the first network device provides a current service for the terminal device.

Therefore, in the method for managing a link according to an embodiment of the present disclosure, the second network device determines the first link quality parameter between the terminal device and the second network device, and sends the first link quality parameter to the first network which is currently serving the terminal device, so that the first network device can accurately manage the link of the terminal device, thereby saving signaling overhead of the terminal device, and improving user experiences.

In a first possible implementation according to the second aspect, sending, by the second network device, the first link quality parameter to the first network device, includes:

periodically sending, by the second network device, the first link quality parameter to the first network device.

In a second possible implementation according to the second aspect, before sending, by the second network device, the first link quality parameter to the first network device, the method further includes:

determining, by the second network device, whether there is a connection between the terminal device and the second network device;

wherein sending, by the second network device, the first link quality parameter to the first network device, includes:

if there is no connection between the terminal device and the second network device and the first link quality parameter is greater than a sixth threshold value, sending, by the second network device, the first link quality parameter to the first network device.

In a third possible implementation according to the second aspect, sending, by the second network device, the first link quality parameter to the first network device, includes:

if the first link quality parameter continues to be greater than the sixth threshold value in a first time period, sending, by the second network device, the first link quality parameter to the first network device.

In a fourth possible implementation according to the second aspect, the method further includes:

if there is a connection between the terminal device and the second network device, and the first link quality parameter is smaller than a seventh threshold value, sending, by the second network device, the first link quality parameter to the first network device.

In a fifth possible implementation according to the second aspect, sending, by the second network device, the first link quality parameter to the first network device, includes:

if the first link quality parameter continues to be smaller than the seventh threshold value in a second time period, sending, by the second network device, the first link quality parameter to the first network device.

In a sixth possible implementation according to the second aspect, the first link quality parameter is at least one of the following parameters between the terminal device and the second network device:

a signal reception strength, a signal reception quality or a link loss.

In a seventh possible implementation according to the second aspect, before sending, by the second network device, the first link quality parameter to the first network device, the method further includes:

receiving, by the second network device, measurement configuration information sent by the first network device, wherein the measurement configuration information is used to instruct the second network device to measure the link quality between the terminal device and the second network device;

sending, by the second network device, the first link quality parameter to the first network device, includes:

sending, by the second network device, a measurement result to the first network device according to the measurement configuration information, wherein the measurement result carries at least one of:

at least one first link quality parameter of a measured beam, a cell, a network transmission point, and frequency point information, and uplink transmission time reference information of the terminal device.

It should be understood that the first link quality information refers to the link quality information corresponding to the measured beam, network transmission point, the cell and the frequency point.

In an eighth possible implementation according to the second aspect, the measurement configuration information includes at least one of:

the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

Further, the transmission time reference information of the terminal device may be advance of the transmission time.

It should be understood that the transmission time reference information of the terminal device refers to the transmission time reference information of the terminal on the corresponding network device link.

In a ninth possible implementation according to the second aspect, before sending, by the second network device, the first link quality parameter to the first network device, the method further includes:

receiving, by the second network device, a request message sent by the first network device, wherein the request message is used to request the second network device to configure a reference signal for the terminal device;

determining, by the second network device, a configuration parameter of the reference signal of the terminal device according to the request message; and sending, by the second network device, the configuration parameter to the first network device.

In a tenth possible implementation according to the second aspect, before sending, by the second network device, the first link quality parameter to a first network device, the method further includes:

receiving, by the second network device, a configuration parameter of a reference signal of the terminal device which is sent by the first network device.

In an eleventh possible implementation according to the second aspect, the configuration parameter includes at least one of:

a resource location occupied by transmitted reference signal, a signal codeword, beam information, a network transmission point, and a transmission power for transmitting the reference signal.

According to a third aspect of the present disclosure, there is provided a device for managing a link, and the device is configured to perform the methods according to the first aspect or any possible implementations in the first aspect. Specifically, the device may include units for performing the methods according to the first aspect or any possible implementations in the first aspect.

According to a fourth aspect of the present disclosure, there is provided a device for managing a link and the device is configured to perform the methods according to the second aspect or any possible implementations in the second aspect. Specifically, the device may include units for performing the methods according to the second aspect or any possible implementations in the second aspect.

According to a fifth aspect of the present disclosure, there is provided a device for managing a link. The device includes a receiver, a transmitter, a memory, a processor and a bus system. The receiver, the transmitter, the memory, and the processor are connected to the bus system. The memory is configured to store instructions. The processor is configured to execute the instructions stored in the memory so as to control the receiver to receive signals, and control the transmitter to transmit signals. When the processor executes the instructions stored in the memory, the processor is caused to perform the methods according to the first aspect or any possible implementations in the first aspect.

According to a sixth aspect of the present disclosure, there is provided a device for managing a link. The device includes a receiver, a transmitter, a memory, a processor and a bus system. The receiver, the transmitter, the memory, and the processor are connected to the bus system. The memory is configured to store instructions. The processor is configured to execute the instructions stored in the memory so as to control the receiver to receive signals, and control the transmitter to transmit signals. When the processor executes the instructions stored in the memory, the processor is caused to perform the methods according to the second aspect or any possible implementations in the first aspect.

According to a seventh aspect of the present disclosure, there is provided a system for managing a link. The system includes the device according to the third aspect or any possible implementations in the third aspect and the device according to the fourth aspect or any possible implementations in the fourth aspect; or the system includes the device according to the fifth aspect or any possible implementations in the fifth aspect and the device according to the sixth aspect or any possible implementations in the sixth aspect.

According to an eighth aspect of the present disclosure, there is provided a computer readable medium for storing computer programs. The computer programs include instructions for performing the methods according to the first aspect or any possible implementations in the first aspect.

According to a ninth aspect of the present disclosure, there is provided a computer readable medium for storing computer programs. The computer programs includes instructions for performing the methods according to the second aspect or any possible implementations in the second aspect.

BRIEF DESCRIPTION OF THE DRAWINGS

In order to more clearly illustrate the technical solutions of the embodiments of the present disclosure, the drawings used in the embodiments or related arts will be briefly described below. Obviously, the drawings in the following descriptions are only some examples of the present disclosure, and those skilled in the art can obtain other drawings according to the drawings described herein without departing from the scope of the present disclosure.

DETAILED DESCRIPTION

The technical solutions according to the embodiments of the present disclosure will be clearly and completely described as follows with reference to the accompanying drawings. It is obvious that the described embodiments are a part of the embodiments of the present disclosure, and not all of the embodiments. All other embodiments obtained by a person of ordinary skill in the art based on the embodiments of the present disclosure described herein without departing from the scope of the present disclosure fall within the scope of the present disclosure.

The method in related arts only considers the signal quality between the terminal device and the original network device, and the terminal device is required to report the measurement result after the signal measurement is completed, which results in wastes of the signaling overhead of the terminal device.

The technical solutions of the embodiments of the present disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS) or Worldwide Interoperability for Microwave Access (WiMAX) communication system, and a communication system that may appear in the future.

In embodiments of the present disclosure, the terminal device may be referred to as a user equipment (UE), terminal equipment, a mobile station (MS), a mobile terminal, or terminal device in the future 5G network. The terminal device can communicate with one or more core networks via a Radio Access Network (RAN). For example, the terminal can be a mobile phone (or referred to as "cellular phone") or a computer having a mobile terminal. For example, the terminal can also be a portable mobile device, a pocket-sized mobile device, a handheld mobile device, a computer-integrated mobile device or an in-vehicle mobile device that exchanges voice and/or data with the wireless access networks.

The network devices in embodiments of the present disclosure may be devices for communicating with a terminal device. The network devices may be Base Transceiver Stations (BTSs) in GSM or CDMA, or may be a base station (NodeB, or abbreviated as "NB") in a WCDMA system, or may be an evolved base station (Evolutional NodeB, referred to as "eNB" or "eNodeB") in the LTE system, or may be a wireless controller under a Cloud Radio Access Network (CRAN) scenario. Alternatively, the network devices may be relay stations, access points, in-vehicle devices, wearable devices, and network devices in the future 5G network or network devices in the future evolved PLMN network.

Figure 1:
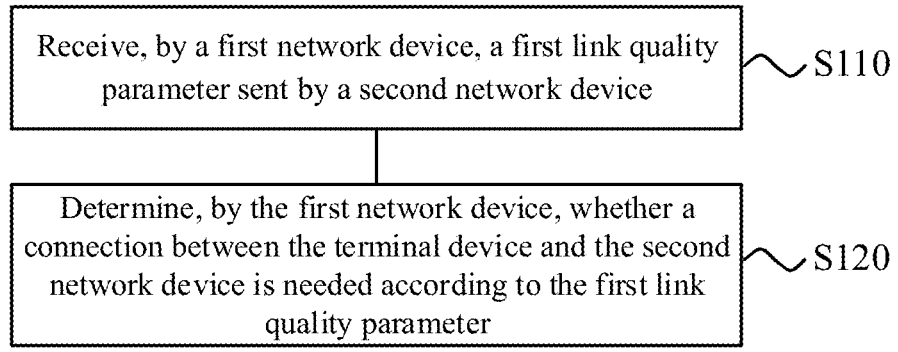
FIG. 1 is a schematic flowchart of a method for managing a link according to an embodiment of the present disclosure.

FIG. 1 shows a schematic flowchart of a method 100 for managing a link according to an embodiment of the present disclosure. FIG. 1 shows steps or operations of the method for managing a link, but the steps or operations are merely examples, and the embodiment of the present disclosure may also perform other operations or variants of the operations in FIG. 1. The method 100 includes the following steps.

In S110, the first network device receives a first link quality parameter sent by the second network device. The first link quality parameter is used to indicate a link quality between the terminal device and the second network device, and the first network device provides a current service for the terminal device.

In S120, the first network device determines, according to the first link quality parameter, whether a connection between the terminal device and the second network device is needed.

Specifically, the first network device provides services for the terminal device, the second network device is adjacent to the first network device, and the first network device may determine whether a connection between the terminal device and the second network device is needed according to the link quality parameter (i.e., the first link quality parameter) between the terminal device and the second network device, so as to manage the link of the terminal device.

Therefore, in the method for managing a link according to an embodiment of the present disclosure, the first network device obtains the first link quality parameter between the terminal device and the second network device, and then the first network device determines whether the connection between the terminal device and the second network device is required according to the first link quality parameter. The method can accurately manage the link of the terminal device, thereby saving signaling overhead of the terminal device, and improving user experiences.

Figure 2:
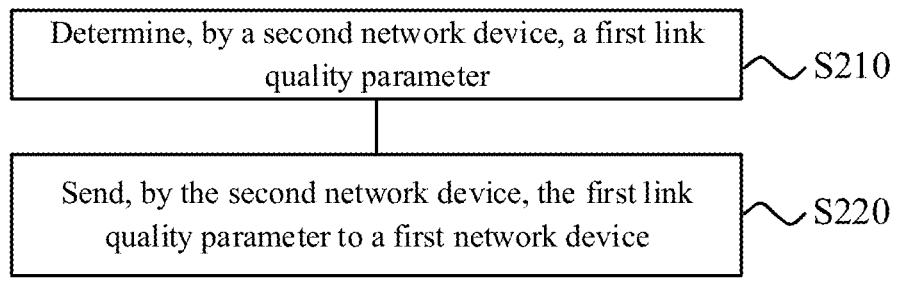
FIG. 2 is a schematic flowchart of a method for managing a link according to an embodiment of the present disclosure.

FIG. 2 shows a schematic flowchart of a method 200 for managing a link according to an embodiment of the present disclosure. FIG. 2 shows steps or operations of the method for managing a link, but the steps or operations are merely examples. The embodiment of the present disclosure may also perform other operations or variants of the operations in FIG. 2. The method 200 includes the following steps.

In S210, the second network device determines a first link quality parameter. The first link quality parameter is used to indicate a link quality between the terminal device and the second network device.

In S220, the second network device sends the first link quality parameter to the first network device. The first network device provides a current service for the terminal device.

Specifically, the first network device provides services for the terminal device, the second network device is adjacent to the first network device, and the second network device determines the link quality parameter (i.e., the first link quality parameter) between the terminal device and the second network device, and sends the first link quality parameter to the first network device, so that the first network device can manage the link of the terminal device according to the first link quality parameter.

The second network device may first measure the connection between the terminal device and the second network device, and determine the first link quality parameter between the terminal device and the second network device, and then send the first link quality parameter to the first network device. It should be understood that the second network device may send the first link quality parameter by using an interface with the first network device, and the present disclosure does not impose specific limitations on this.

Therefore, in the method for managing a link according to an embodiment of the present disclosure, the second network device determines the first link quality parameter between the terminal device and the second network device, and sends the first link quality parameter to the first network which is currently serving the terminal device, so that the first network device can accurately manage the link of the terminal device, thereby saving signaling overhead of the terminal device, and improving user experiences.

As an optional embodiment, in S120, that is, before determining, by the first network device, whether the connection between the terminal device and the second network device is needed according to the first link quality parameter, the method also includes:

obtaining, by the first network device, a second link quality parameter, wherein the second link quality parameter is used to indicate a link quality between the terminal device and the first network device.

Step S120, i.e. determining, by the first network device, whether a connection between the terminal device and the second network device is needed according to the first link quality parameter, may include:

determining, by the first network device, whether the connection between the terminal device and the second network device is needed according to the first link quality parameter and the second link quality parameter.

Specifically, the first network device can obtain not only the link quality parameter (that is, the first link quality parameter) between the terminal device and the second network device, but also the link quality parameter (i.e., the second link quality parameter) between the terminal device and the first network device. The first network device determines whether the connection between the terminal device and the second network is needed by considering both the first link quality parameter and the second link quality parameter.

It should be understood that, in S120, the first network device may determine, in various manners, whether a connection between the terminal device and the second network device is required. The first network device may determine, according to the first link quality parameter between the terminal device and the second network device only, whether a connection between the terminal device and the second network device is required. Alternatively, the first network device may determine whether connection between the terminal device and the second network device is required according to both the first link quality parameter between the device and the second network device and the second link quality parameter between the terminal device and the first network device. Embodiments of the present disclosure do not impose specific limitations on this.

As an optional embodiment, determining, by the first network device, whether the connection between the terminal device and the second network device is needed according to the first link quality parameter and the second link quality parameter, includes:

if the first link quality parameter is greater than a first threshold value, and the second link quality parameter is smaller than a second threshold value, determining, by the first network device, that the connection between the terminal device and the second device is needed.

Specifically, if the first link quality parameter is greater than the first threshold value, and the second link quality parameter is smaller than the second threshold value, it can be determined that the quality of the link between the terminal device and the second network device is better than the quality of the link between the terminal device and the first network device. Therefore, the first network device can determine that the connection between the terminal device and the second network device is required.

It should be understood that the foregoing first threshold value and the second threshold value are preset values, which may be determined in advance by the first network device, but the embodiments of the present disclosure are not limited thereto.

As an optional embodiment, determining, by the first network device, whether the connection between the terminal device and the second network device is needed according to the first link quality parameter and the second link quality parameter, includes:

if the first link quality parameter is greater than a sum of the second link quality parameter and a third threshold value, determining, by the first network device, that the connection between the terminal device and the second network device is needed.

Specifically, if the first link quality parameter is greater than a sum of the second link quality parameter and the third threshold value, that is, the first link quality parameter is greater than a shifted value of the second link quality parameter, it can be determined that the quality of the link between the terminal device and the second network device is better than the quality of the link between the terminal device and the first network device, and the first network device can determine that the connection between the terminal device and the second device is needed.

It should be understood that the foregoing third threshold value is a preset value, which may be determined in advance by the first network device, but the embodiments of the present disclosure are not limited thereto.

As an optional embodiment, determining, by the first network device, whether the connection between the terminal device and the second network device is needed according to the first link quality parameter and the second link quality parameter, includes:

if the first link quality parameter is smaller than a fourth threshold value, and the second link quality parameter is greater than a fifth threshold value, determining, by the first network device, that the connection between the terminal device and the second network device is not needed.

As an alternative, if the first link quality parameter is smaller than the fourth threshold value, the first network device determines that the connection between the terminal device and the second network device is not needed.

As an alternative, if the second link quality parameter is greater than the fifth threshold value, the first network device determines that the connection between the terminal device and the second network device is not needed.

Specifically, the first network device may determine that the connection between the terminal device and the second network device is not required if the first link quality parameter is smaller than the fourth threshold value, may determine that the connection between the terminal device and the second network device is not required if the link quality parameter is greater than the fifth threshold value, or may determine that the connection between the terminal device and the second network device is not required if the first link quality parameter may be smaller than a fourth threshold and the second link quality parameter is greater than the fifth threshold value. The present disclosure does not impose specific limitations on this.

It should be understood that the foregoing fourth threshold value and the fifth threshold value are preset values, which may be determined in advance by the first network device, but the embodiments of the present disclosure are not limited thereto.

Optionally, the fourth threshold value may be the foregoing first threshold value, and the fifth threshold value may be the foregoing second threshold value.

As an optional embodiment, after S120, i.e., after determining whether the connection between the terminal device and the second network device is needed, the method further includes:

if it is determined that the connection between the terminal device and the second network device is needed, and there is no connection between the terminal device and the second network device, establishing, by the first network device, the connection between the terminal device and the second network device.

Specifically, after determining whether the connection between the terminal device and the second network device is required, the first network device may perform a corresponding operation according to the current connection condition. If the first network device determines that a connection between the terminal device and the second network device is required, and there is no connection between the terminal device and the second network device, the first network device may establish the connection between the terminal device and the second network device.

Optionally, if the first network device determines that the connection between the terminal device and the second network device is required, and there exists a connection between the terminal device and the second network device, the first network device may not perform any operation, and the present disclosure does not impose specific limitations on this.

It should be understood that, in the absence of a connection between the terminal device and the second network device, the first network device may establish a connection between the terminal device and the second network device in multiple manners.

As an optional embodiment, establishing, by the first network device, the connection between the terminal device and the second network device, includes:

adding, by the first network device, the connection between the terminal device and the second network device as an auxiliary connection of a link of the terminal device according to the first link quality parameter.

Specifically, the first network device may set a connection between the terminal device and the second network device as an auxiliary connection of the link of the terminal device. The first network device still serves as a primary connection of the second network device, providing services for the terminal device.

It should be understood that the data transmitted on the auxiliary connection of the link of the terminal device may be the same as the data transmitted on the primary connection, or may be different, which is not limited in embodiments of the present disclosure.

As an optional embodiment, establishing, by the first network device, the connection between the terminal device and the second network device, includes:

switching, by the first network device, a link of the terminal device to the second network device according to the first link quality parameter.

Specifically, the first network device may directly switch the link of the terminal device to the second network device, and the second network device provides services for the terminal device.

In an implementation, the first network device may determine, according to the first link quality parameter, whether the connection between the terminal device and the second network device is set as a primary connection or a secondary connection. If the first link quality parameter indicates that the quality of the link between the terminal device and the second network device is good, the first network device may set the connection between the terminal device and the second network device as the primary link, that is, switching between the network devices is performed. If the first link quality parameter indicates that the quality of the link between the terminal device and the second network device is good, and at the same time, the second link quality parameter indicates that the quality of the link between the terminal and the first network device is also good, and the first network device can set the connection between the terminal device and the second network device as the secondary connection.

As an optional embodiment, after S120, i.e., after determining whether the connection between the terminal device and the second network device is needed, the method further includes:

if it is determined that the connection between the terminal device and the second network device is not needed, and there exists a connection between the terminal device and the second network device, deleting, by the first network device, the connection between the terminal device and the second network device.

Specifically, after determining whether the connection between the terminal device and the second network device is required, the first network device may perform a corresponding operation according to the current connection condition. If the first network device determines that a connection between the terminal device and the second network device is not required, and there exists a connection between the terminal device and the second network device, the first network device may delete the connection between the terminal device and the second network device.

It should be understood that the terminal device is currently served by the first network device. Therefore, if there is a connection between the terminal device and the second network device, the connection is necessarily an auxiliary connection of the link of the terminal device. After the first network device deletes the connection between the terminal device and the second network device, the connection of the terminal device is changed from a dual connection to a single connection, and only the first network device provides services for the terminal device.

Optionally, if the first network device determines that the connection between the terminal device and the second network device is not required, and there is no connection between the terminal device and the second network device, the first network device may not perform any operation, which is not limited by the embodiments of the present disclosure.

As an optional embodiment, sending, by the second network device, the first link quality parameter to the first network device, includes:

periodically sending, by the second network device, the first link quality parameter to the first network device Specifically, the second network device may periodically send the first link quality parameter to the first network device, or may send the first link quality parameter to the first network device when the first link quality parameter meets a preset condition, and embodiments of the present disclosure do not impose specific limitations on this.

As an optional embodiment, before sending, by the second network device, the first link quality parameter to the first network device, the method further includes:

determining, by the second network device, whether there is a connection between the terminal device and the second network device;

wherein sending, by the second network device, the first link quality parameter to the first network device, includes:

if there is no connection between the terminal device and the second network device and the first link quality parameter is greater than a sixth threshold value, sending, by the second network device, the first link quality parameter to the first network device.

Specifically, after the second network device determines the first link quality parameter, whether there is a connection between the terminal device and the second network device may be determined. If there is no connection between the terminal device and the second network device, the second network device may determine whether the first link quality parameter is greater than the sixth threshold value. If the first link quality parameter is greater than the sixth threshold value, the second network device sends the first link quality parameter to the first network device.

In this way, in the case that there is no connection between the terminal device and the second network device, the purpose of sending the first link quality parameter is to establish a connection between the terminal device and the second network device when the quality of the link between the terminal device and the second network device is relatively good. Thus, the second network device may send the first network device to the first network device only when the first link quality parameter is greater than the sixth threshold value, thereby saving signaling overhead.

As an optional embodiment, sending, by the second network device, the first link quality parameter to the first network device, includes:

if the first link quality parameter continues to be greater than the sixth threshold value in a first time period, sending, by the second network device, the first link quality parameter to the first network device.

Specifically, the second network device may start a timer to detect the first link quality parameter at each moment in the first time period, and if the first link quality parameter continues to be greater than the sixth threshold value in the first time period, the first link quality parameter is sent to the first network device.

In this way, the second network device performs statistics and determination on the first link quality parameter in the first time period, and then sends the first link quality parameter to the first network device if the preset condition is met, and thus inaccurate management of the link of the terminal device by the first network device due to the unstable link quality between the terminal device and the second network device can be avoided, thereby saving signaling overhead.

As an optional embodiment, the method further includes:

if there is a connection between the terminal device and the second network device, and the first link quality parameter is smaller than a seventh threshold value, sending, by the second network device, the first link quality parameter to the first network device.

Specifically, after the second network device determines the first link quality parameter, whether there is a connection between the terminal device and the second network device may be determined. If there is a connection between the terminal device and the second network device, the second network device may determine the whether the first link quality parameter is smaller than the seventh threshold value. If the first link quality parameter is smaller than the seventh threshold value, the first link quality parameter is sent to the first network device.

Optionally, the seventh threshold value is smaller than the sixth threshold value.

Thus, in the case where there is a connection between the terminal device and the second network device, the purpose of transmitting the first link quality parameter is to delete the connection between the terminal device and the second network device when the link quality between the terminal device and the second network device. Thus, the second network device may send the first network device to the first network device only when the first link quality parameter is smaller than the seventh threshold value, thereby saving signaling overhead.

As an optional embodiment, sending, by the second network device, the first link quality parameter to the first network device, includes:

if the first link quality parameter continues to be smaller than the seventh threshold value in a second time period, sending, by the second network device, the first link quality parameter to the first network device.

Specifically, the second network device may start a timer to detect a first link quality parameter at each moment in the second time period, and if the first link quality parameter continues to be smaller than the seventh threshold value in the second time period, the first link quality parameter is sent to the first network device.

In this way, the second network device performs statistics and determination on the first link quality parameter in the second time period, and then sends the first link quality parameter to the first network device if the preset condition is met, and thus inaccurate management of the link of the terminal device by the first network device due to the unstable link quality between the terminal device and the second network device can be avoided, thereby saving signaling overhead.

In an optional embodiment, the first link quality parameter is at least one of the following parameters between the terminal device and the second network device:

a signal reception strength, a signal reception quality or a link loss.

Specifically, the link loss may be calculated by the second network device according to a difference between a power value of the signal sent by the terminal device and a signal receiving strength. The power value of the signal sent by the terminal device may be sent by the first network device to the second network device.

As an optional embodiment, before S120, i.e., before sending, by the second network device, the first link quality parameter to the first network device, the method further includes:

receiving, by the second network device, measurement configuration information sent by the first network device, wherein the measurement configuration information is used to instruct the second network device to measure the link quality between the terminal device and the second network device.

Correspondingly, the second network device receives the measurement configuration information sent by the first network device.

The step of sending, by the second network device, the first link quality parameter to the first network device, includes:

sending, by the second network device, a measurement result to the first network device according to the measurement configuration information. The measurement result carries at least one of:

at least one first link quality parameter of a measured beam, a cell, a network transmission point, and frequency point information, and uplink transmission time reference information of the terminal device.

It should be understood that the first link quality information refers to link quality information corresponding to the measured beam, network transmission point, cell, and frequency point.

Correspondingly, receiving, by the first network device, the first link quality parameter sent by the second network device, includes:

receiving, by the first network device, a measurement result that is sent by the second network device according to the measurement configuration information, wherein the measurement result carries at least one of:

at least one first link quality parameter of a measured beam, a cell, a network transmission point, and frequency point information, and uplink transmission time reference information of the terminal device.

It should be understood that the first link quality information refers to link quality information corresponding to the measured beam, network transmission point, cell, and frequency point.

Specifically, the first network device may send measurement configuration information to the second network device, so as to instruct the second network device to measure a link quality between the terminal device and the second network device. The measurement configuration information includes relevant parameters of the measurement. After receiving the measurement configuration information sent by the first network device, the second network device may measure the link quality between the terminal device and the second network device according to the parameters carried in the measurement configuration information. The second network device sends a measurement result to the first network device according to the configuration in the measurement configuration information. The measurement result may specifically include the first link quality parameter and the measured cell or frequency point information.

As an optional embodiment, the measurement configuration information includes at least one of:

the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

Further, the transmission time reference information of the terminal device may be advance of the transmission time.

It should be understood that the transmission time reference information of the terminal device refers to the transmission time reference information of the terminal on the corresponding network device link.

Specifically, the measurement quantity information refers to a quantity that needs to be measured, and may specifically include measuring a signal reception intensity, or measuring a path loss, or measuring a signal reception intensity and a path loss, and the like. The measurement result reporting condition may be a periodic report or an event triggering report. For the periodic report, the measurement result reporting condition may also carry the configuration information of the periodicity. For the event triggering report, the measurement result reporting condition may also carry the corresponding event(s), for example, the first link quality parameter is greater than the sixth threshold value, or the first link quality parameter is smaller than the seventh threshold value; if the timer is enabled, the measurement result reporting condition may also carry the first time period and the second time. The measurement event trigger amount refers to the measurement quantity that triggers the above event(s), which may be the signal reception strength or the path loss. The measurement result reporting quantity is the same as the measurement quantity information, that is, the result of the measurement based on the measurement quantity information is reported. The measurement result reporting interval indicates that the measurement result can be reported again after a minimum interval from the last measurement result is reported. This is mainly to prevent the sudden temporary change of the link quality. The time advance of the terminal device is used to indicate how long the terminal device should take operations in advance when the terminal device needs to establish a link. For example, the time advance may notify the terminal device to perform operations 30 ms or 50 ms ahead, which is not limited by the embodiments of the present invention. The terminal device needs to synchronize with the second network device in the process of establishing a link with the second network device, and thus the terminal device sends data to the second network device according to the time advance amount, which can reduce the delay in the establishment of connection by the terminal device.

It should be understood that the first link quality parameter acquired by the first network device may be obtained by the second network device which measures the link quality between the terminal device and the second network device. The second network device may measure a link quality between the terminal device and the second network device by using a reference signal. The related parameters of the reference signal may be configured by the second network device, or may be configured by the first network device, which is not limited in embodiments of the present disclosure.

As an optional embodiment, before receiving, by the first network device, the first link quality parameter sent by the second network device, the method further includes:

sending, by the first network device, a request message to the second network device, wherein the request message is used to request the second network device to configure a reference signal for the terminal device.

Correspondingly, the second network device receives the request message sent by the first network device.

And, the second network device determines the configuration parameter of the reference signal according to the request message.

The second network device sends the configuration parameter of the reference to the first network device.

Correspondingly, the first network device receives the configuration parameter of the reference signal sent by the second network device.

The first network device sends the configuration parameter to the terminal device.

Specifically, the first network device may send a request message to the second network device, requesting the second network device to configure a reference signal for the terminal device. After receiving the request message, the second network device determines a configuration parameter of the reference signal, and sends configuration parameter to the first network device. The first network device sends the configuration parameter of the reference signal to the terminal device, and the terminal device can send the reference signal according to the configuration of the second network device.

As an optional embodiment, before S110, i.e., before receiving, by the first network device, the first link quality parameter sent by the second network device, the method further includes:

sending, by the first network device, a configuration parameter of a reference signal of the terminal device to the second network device.

Correspondingly, the second network device receives the configuration parameter of a reference signal of the terminal device that is sent by the first network device.

Specifically, the first network device may determine the configuration parameter of the reference signal and send the configuration parameter to the second network device. The second network device receives the configuration parameter of the reference signal, and directly receives the reference signal sent by the terminal device on corresponding resources according to the configuration parameter, so as to measure the link between the terminal device and the second network device.

It should be understood that the reference signal between the terminal device and the second network device may be a Sounding Reference Signal (SRS) or a Physical Uplink Control Channel (PUCCH) signal, or a Physical Uplink Shared Channel (PUSCH) signal, or may also be any other possible signal, which is not limited in embodiments of the present disclosure.

As an optional embodiment, the configuration parameter includes at least one of:

a resource location occupied by transmitted reference signal, a signal codeword, beam information, a network transmission point, and a transmission power for transmitting the reference signal.

It should be understood that the foregoing link management method is applicable to both the uplink and the downlink, especially when the uplink and downlink of the terminal device have symmetric features or the path losses of the uplink and downlink are equivalent. The present disclosure does not impose specific limitations on this.

As an optional embodiment, the foregoing first network device and the second network device may be base stations, transmission points, or beams. In addition, the cell corresponding to the first network device and the cell corresponding to the second network device may also be base stations, transmission points, or beams. The present disclosure does not impose specific limitations on this.

It should be understood that the method for managing a link in the embodiments of the present disclosure may be used to manage part or all of the bearers of the terminal device, and may also be used to manage part or all of the data streams of the terminal device. The present disclosure does not impose specific limitations on this.

Figure 3:
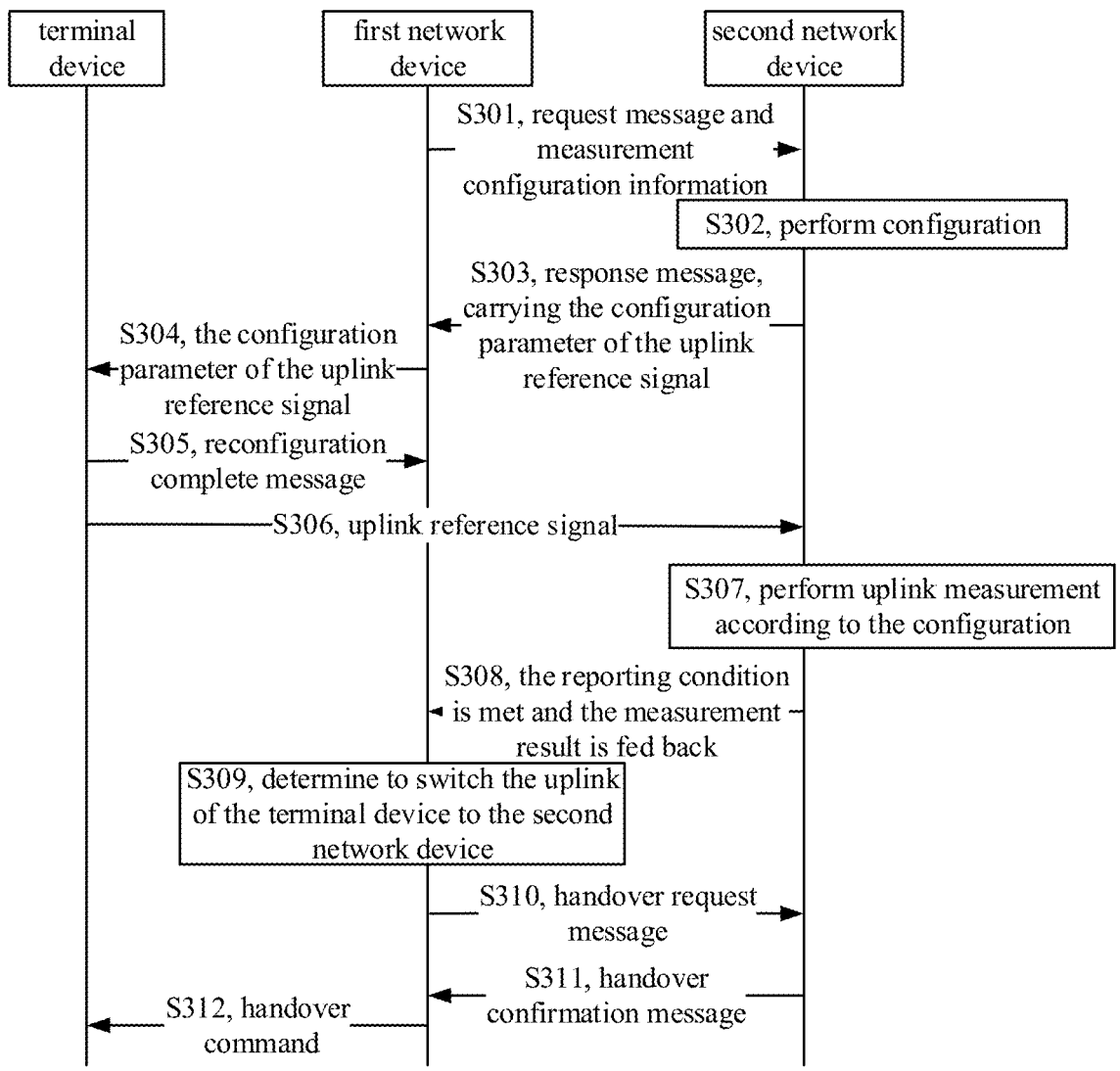
FIG. 3 is a schematic flowchart of a method for managing a link according to an embodiment of the present disclosure.

FIG. 3 shows a schematic flowchart of a method 300 for managing a link according to an embodiment of the present disclosure. FIG. 3 illustrates the steps or operations of the method for managing a link, but the steps or operations are merely examples. The embodiment of the present disclosure may also perform other operations or variants of the operations of FIG. 3. The method 300 includes the following steps.

In S301, the first network device sends a request message and a measurement configuration message to the second network device. The request message is used to request the second network device to configure an uplink reference signal for the terminal device. The measurement configuration message is used to instruct the second network device to measure the uplink quality between the terminal device and the second network device. The measurement configuration information includes parameters related to the measurement.

In S302, the second network device receives the request message and the measurement configuration message, configures an uplink reference signal and determines a configuration parameter of the uplink reference signal.

In S303, the second network device sends a response message to the first network device. The response message carries the configuration parameter of the uplink reference signal.

In S304, the first network device sends the configuration parameter of the uplink reference signal to the terminal device.

In S305, the terminal device receives the configuration parameter of the uplink reference signal, configures an uplink reference signal, and sends a reconfiguration complete message to the first network device.

In S306, the terminal device sends an uplink reference signal to the second network device.

In S307, the second network device receives the uplink reference signal, and performs uplink quality measurement according to the configuration parameter in the measurement configuration message to obtain a first link quality parameter.

In S308, in the case that the first link quality parameter meets the reporting condition, the second network device sends the first link quality parameter to the first network device.

In S309, the first network device determines that the uplink of the terminal device needs to be switched to the second network device according to the uplink quality between the terminal device and the first network device itself and the uplink quality between the terminal and the second network device.

In S310, the first network device sends a handover request message to the second network device.

In S311, the second network device receives the handover request message, and sends a handover confirmation message to the second network device.

In S312, after receiving the handover confirmation message, the first network device sends a handover command to the terminal device.

Therefore, in the method for managing a link according to the embodiment of the present disclosure, the second network device measures the link quality between the terminal device and the second network device itself, obtains the first link quality parameter and sends the first link quality parameter to the first network device. The first network device determines whether the terminal device connection needs to be switched to the second network device according to the first link quality parameter and the second link quality parameter between the terminal device and the first network device. Thus, the method can accurately manage the link of the terminal device, thereby saving signaling overhead of the terminal device, and improving user experiences.

It should be understood that the foregoing embodiments of the present disclosure are described using an example of the uplink, but the embodiments of the present invention are not limited thereto.

It should be understood that, in the various embodiments of the present disclosure, the sequence numbers of the foregoing processes or steps do not mean the order of the processes or steps, and the order of the processes or steps should be determined by their functions and internal logic, and should not impose any undue limitations on the implementations of the present disclosure.

Figure 4:
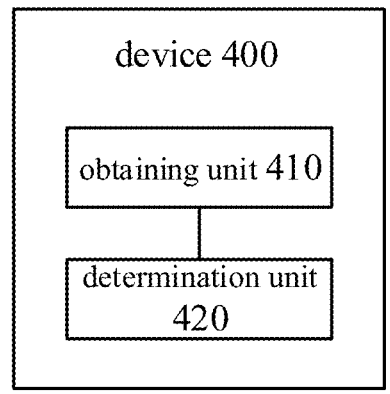
FIG. 4 is a schematic block diagram of a device for managing a link according to an embodiment of the present disclosure.

FIG. 4 is a schematic block diagram of a device 400 for managing a link according to an embodiment of the present disclosure. As shown in FIG. 4, the device 400 includes an obtaining unit 410 and a determination unit 420.

The obtaining unit 410 is configured to receive a first link quality parameter sent by a second network device. The first link quality parameter is used to indicate a link quality between a terminal device and the second network device, and the device provides a current service for the terminal device.

The determination unit 420 is configured to determine whether a connection between the terminal device and the second network device is needed according to the first link quality parameter.

Thus, in the device for managing a link according to an embodiment of the present disclosure, the first network device obtains the first link quality parameter between the terminal device and the second network device, and then the first network device determines whether the connection between the terminal device and the second network device is required according to the first link quality parameter. The device can accurately manage the link of the terminal device, thereby saving signaling overhead of the terminal device, and improving user experiences.

Optionally, the obtaining unit 410 is further configured to: before whether the connection between the terminal device and the second network device is needed is determined according to the first link quality parameter, obtain a second link quality parameter, wherein the second link quality parameter is used to indicate a link quality between the terminal device and the first network device. The determination unit 420 is configured to: determine whether the connection between the terminal device and the second network device is needed according to the first link quality parameter and the second link quality parameter.

Optionally, the determination unit 420 is configured to: if the first link quality parameter is greater than a first threshold value, and the second link quality parameter is smaller than a second threshold value, determine that the connection between the terminal device and the second network device is needed.

Optionally, the determination unit 420 is configured to: if the first link quality parameter is greater than a sum of the second link quality parameter and a third threshold value, determine that the connection between the terminal device and the second network device is needed.

Optionally, the determination unit 420 is configured to: if the first link quality parameter is smaller than a fourth threshold value, and the second link quality parameter is greater than a fifth threshold value, determine that the connection between the terminal device and the second network device is not needed.

Optionally, if the first link quality parameter is smaller than the fourth threshold value, the first network device determines that the connection between the terminal device and the second network device is not needed.

Optionally the device further includes an establishment unit configured to, after whether the connection between the terminal device and the second network device is needed is determined, if it is determined that the connection between the terminal device and the second network device is needed, and there is no connection between the terminal device and the second network device, establish the connection between the terminal device and the second network device.

Optionally, the establishment unit is configured to: add the connection between the terminal device and the second network device as an auxiliary connection of a link of the terminal device according to the first link quality parameter.

Optionally, the establishment unit is configured to: switch a link of the terminal device to the second network device according to the first link quality parameter.

Optimally, the device further includes a deletion unit configured to, after whether the connection between the terminal device and the second network device is needed is determined, if it is determined that the connection between the terminal device and the second network device is not needed, and there exists a connection between the terminal device and the second network device, delete the connection between the terminal device and the second network device.

Optionally, the first link quality parameter is at least one of the following parameters between the terminal device and the second network device: a signal reception strength, a signal reception quality or a link loss.

Optionally, the device further includes a first sending unit configured to, before the first link quality parameter sent by the second network device is received, send measurement configuration information to the second network device, wherein the measurement configuration information is used to instruct the second network device to measure the link quality between the terminal device and the second network device.

The obtaining unit 410 is configured to:

receive a measurement result that is sent by the second network device according to the measurement configuration information, wherein the measurement result carries at least one of:

at least one first link quality parameter of a measured beam, a cell, a network transmission point, and frequency point information, and uplink transmission time reference information of the terminal device.

It should be understood that the first link quality information refers to link quality information corresponding to the measured beam, network transmission point, the cell, and the frequency point.

Optionally, the measurement configuration information includes at least one of:

the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

Further, the transmission time reference information of the terminal device may be advance of the transmission time.

It should be understood that the transmission time reference information of the terminal device refers to the transmission time reference information of the terminal on the corresponding network device link.

Optionally, the device further includes a second sending unit configured to, before the first link quality parameter sent by the second network device is received, send a request message to the second network device, wherein the request message is used to request the second network device to configure a reference signal for the terminal device.

The obtaining unit 410 is further configured to receive a configuration parameter of the reference signal sent by the second network device. The second sending unit is further configured to send the configuration parameter to the terminal device.

Optionally, the device is further configured to, before the first link quality parameter sent by the second network device is received, send a configuration parameter of a reference signal of the terminal device to the second network device.

Optionally, the configuration parameter includes at least one of:

a resource location occupied by transmitted reference signal, a signal codeword, beam information, a network transmission point, and a transmission power for transmitting the reference signal.

It should be understood that the device 400 herein is embodied in the form of functional modules. The term "unit" herein may refer to an application specific integrated circuit (ASIC), an electronic circuit, a processor for executing one or more software or firmware programs (e.g., a shared processor, a proprietary processor, or a group processor) and a memory, merged logic circuits and/or other suitable components that support the functions described herein. In an optional example, those skilled in the art may understand that the device 400 may be specifically the first network device in the foregoing embodiments, and the device 400 may be used to perform various processes or steps corresponding to the first network device in the foregoing method embodiments. Details regarding the device 400 can be found in the descriptions regarding the method embodiments and repeated descriptions are omitted.

Figure 5:
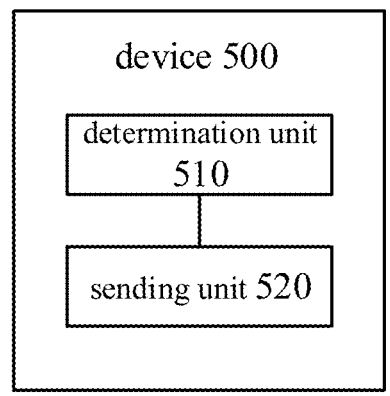
FIG. 5 is a schematic block diagram of a device for managing a link according to an embodiment of the present disclosure.

FIG. 5 is a schematic block diagram of a device 500 for managing a link according to an embodiment of the present disclosure. As shown in FIG. 5, the device 500 includes a determination unit 510 and a sending unit 520.

The determination unit 510 is configured to determine a first link quality parameter, wherein the first link quality parameter is used to indicate a link quality between a terminal device and the second network device.

The sending unit 520 is configured to send the first link quality parameter to a first network device, wherein the first network device provides a current service for the terminal device.

Therefore, in the device for managing a link according to an embodiment of the present disclosure, the second network device determines the first link quality parameter between the terminal device and the second network device, and sends the first link quality parameter to the first network which is currently serving the terminal device, so that the first network device can accurately manage the link of the terminal device, thereby saving signaling overhead of the terminal device, and improving user experiences.

Optionally, the sending unit 520 is configured to: periodically send the first link quality parameter to the first network device.

Optionally, the determination unit 510 is further configured to, before the first link quality parameter is sent to the first network device, determine whether there is a connection between the terminal device and the second network device.

The sending unit 520 is configured to: if there is no connection between the terminal device and the second network device and the first link quality parameter is greater than a sixth threshold value, send the first link quality parameter to the first network device.

Optionally, the sending unit 520 is further configured to: if the first link quality parameter continues to be greater than the sixth threshold value in a first time period, send the first link quality parameter to the first network device.

Optionally, the sending unit 520 is further configured to: if there is a connection between the terminal device and the second network device, and the first link quality parameter is smaller than a seventh threshold value, send the first link quality parameter to the first network device.

Optionally, the sending unit 520 is configured to: if the first link quality parameter continues to be smaller than the seventh threshold value in a second time period, send the first link quality parameter to the first network device.

Optionally, the first link quality parameter is at least one of the following parameters between the terminal device and the second network device:

a signal reception strength, a signal reception quality or a link loss.

Optionally, the device further includes a first receiving unit configured to, before the first link quality parameter is sent to the first network device, receive measurement configuration information sent by the first network device, wherein the measurement configuration information is used to instruct the second network device to measure the link quality between the terminal device and the second network device. The sending unit 520 is configured to send a measurement result to the first network device according to the measurement configuration information, wherein the measurement result carries at least one of:

at least one first link quality parameter of a measured beam, a cell, a network transmission point, and frequency point information, and uplink transmission time reference information of the terminal device.

It should be understood that the first link quality information refers to link quality information corresponding to the measured beam, network transmission point, cell, and frequency point.

Optionally, the measurement configuration information includes at least one of:

the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

Further, the transmission time reference information of the terminal device may be advance of the transmission time.

It should be understood that the transmission time reference information of the terminal device refers to the transmission time reference information of the terminal on the corresponding network device link.

Optionally, the device further includes a second sending unit configured to, before the first link quality parameter is sent to the first network device, receive a request message sent by the first network device, wherein the request message is used to request the second network device to configure a reference signal for the terminal device. The determination unit 510 is further configured to determine a configuration parameter of the reference signal of the terminal device according to the request message. The sending unit 520 is further configured to send the configuration parameter to the first network device.

Optionally, the device further includes a third receiving unit configured to, before the first link quality parameter is sent to the first network device, receive a configuration parameter of a reference signal of the terminal device which is sent by the first network device.

Optionally, the configuration parameter includes at least one of:

a resource location occupied by transmitted reference signal, a signal codeword, beam information, a network transmission point, and a transmission power for transmitting the reference signal.

It should be understood that the device 500 herein is embodied in the form of functional modules. The term "unit" herein may refer to an application specific integrated circuit (ASIC), an electronic circuit, a processor for executing one or more software or firmware programs (e.g., a shared processor, a proprietary processor, or a group processor) and a memory, merged logic circuits and/or other suitable components that support the functions described herein. In an optional example, those skilled in the art may understand that the device 500 may be specifically the second network device in the foregoing embodiments, and the device 500 may be used to perform various processes or steps corresponding to the second network device in the foregoing method embodiments. Details regarding the device 500 can be found in the descriptions regarding the method embodiments and repeated descriptions are omitted.

Figure 6:
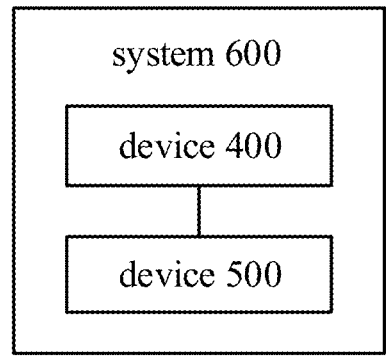
FIG. 6 is a schematic block diagram of a system for managing a link according to an embodiment of the present disclosure.

FIG. 6 is a schematic block diagram of a system 600 for managing a link according to an embodiment of the present disclosure. As shown in FIG. 6, the communication system 600 includes the device 400 and the device 500.

The device 400 is configured to perform various processes and/or steps corresponding to the first network device in the foregoing method embodiments, and the device 500 is configured to perform various processes and/or steps corresponding to the second network device in the foregoing method embodiments. Repeated descriptions are omitted here.

Figure 7:
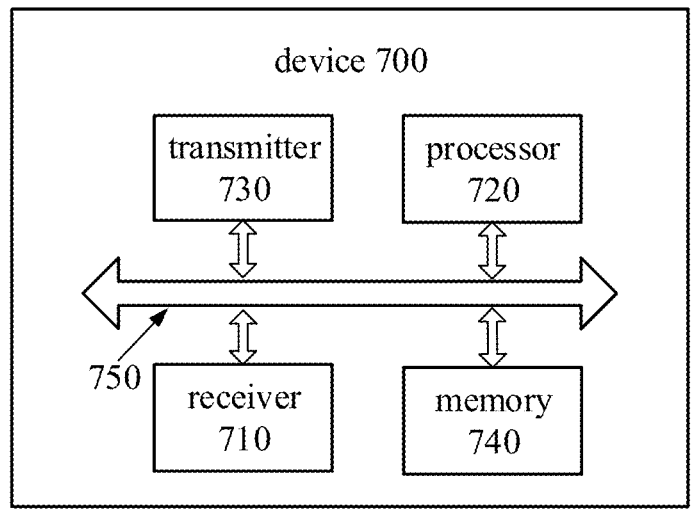
FIG. 7 is a schematic block diagram of a device for managing a link according to an embodiment of the present disclosure.

FIG. 7 shows a device 700 for managing a link provided by an embodiment of the present disclosure. The device 700 includes a receiver 710, a processor 720, a transmitter 730, a memory 740, and a bus system 750. The receiver 710, the processor 720, the transmitter 730 and the memory 740 are connected by the bus system 750. The memory 740 stores instruction. The processor 720 executes the instructions stored in the memory 740 to control the receiver 710 to receive signals and control the transmitter 730 to send instructions.

The receiver 710 is configured to receive the first link quality parameter sent by the second network device. The first link quality parameter is used to indicate a link quality between the terminal device and the second network device. The device provides current services for the terminal device.

The processor 720 is configured to determine, according to the first link quality parameter acquired by the obtaining unit, whether a connection between the terminal device and the second network device is required.

It should be understood that the device 700 may be specifically the first network device in the foregoing embodiment, and may be used to perform various steps and/or processes corresponding to the first network device in the foregoing method embodiments. Optionally, the memory 740 can include read only memory and random access memory and provides instructions and data to the processor. A portion of the memory may also include a non-volatile random access memory. For example, the memory can also store information of the device type. The processor 720 can be configured to execute instructions stored in the memory, and when the processor executes the instructions, the processor can perform the steps corresponding to the first network device in the above method embodiments.

Figure 8:
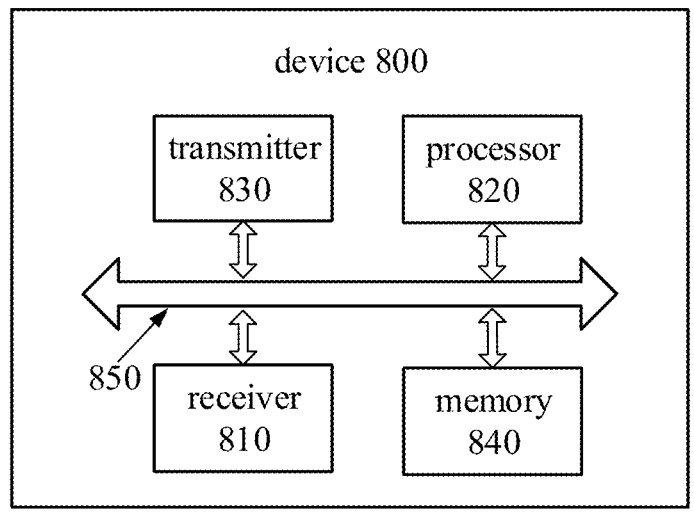
FIG. 8 is a schematic block diagram of a device for managing a link according to an embodiment of the present disclosure.

FIG. 8 shows a device 800 for managing a link provided by an embodiment of the present disclosure. The device 800 includes a receiver 810, a processor 820, a transmitter 830, a memory 840, and a bus system 850. The receiver 810, the processor 820, the transmitter 830, and the memory 840 are connected by a bus system 850. The memory 840 stores instructions. The processor 820 executes the instructions stored in the memory 840 to control the receiver 810 to receive signals and control the transmitter 830 to send instructions.

The processor 820 is configured to determine the first link quality parameter. The first link quality parameter is used to indicate a link quality between the terminal device and the device.

The transmitter 830 is configured to send the first link quality parameter to a first network device. The first network device provides current services for the terminal device.

It should be understood that the device 800 may be specifically the second network device in the foregoing embodiments, and may be used to perform various steps and/or processes corresponding to the second network device in the foregoing method embodiments. Optionally, the memory 840 can include read only memory and random access memory and provides instructions and data to the processor. A portion of the memory may also include a non-volatile random access memory. For example, the memory can also store information of the device type. The processor 820 can be configured to execute instructions stored in the memory, and when the processor executes the instructions, the processor can perform the steps corresponding to the second network device in the foregoing method embodiments.

It should be understood that, in embodiments of the present disclosure, the processor may be a central processing unit (CPU), and the processor may also be other general-purpose processors, digital signal processors (DSPs), application specific integrated circuits (ASICs), Field Programmable Gate Array (FPGA) or other programmable logic device, discrete gate or transistor logic device, discrete hardware components, etc. The general purpose processor may be a microprocessor or the processor or any conventional processor or the like.

It should be understood that the term "and/or" herein is merely an association relationship describing associated objects, indicating that there may be three relationships. For example, "A and/or B" may indicate that A exists alone, and A and B exist simultaneously, and A exists alone. In addition, the character "/" herein generally indicates that the objects before or after the character "/" have an "or" relationship.

It should be understood that, in the various embodiments of the present disclosure, the sequence numbers of the foregoing processes or steps do not mean the order of the processes or steps, and the order of the processes or steps should be determined by their functions and internal logic, and should not impose any undue limitations on the implementations of the present disclosure.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solutions. A person skilled in the art can use different methods for implementing the described functions for each particular application, but such implementation should not be considered to be beyond the scope of the present disclosure.

A person skilled in the art can clearly understand that for the convenience and brevity of the description, details of the working processes of the systems, the devices and the units described above be found in the descriptions regarding corresponding processes in the method embodiments and repeated descriptions are omitted herein.

In the several embodiments provided by the present disclosure, it should be understood that the disclosed systems, devices, and methods may be implemented in other manners. For example, the device embodiments described above are merely illustrative. For example, the division of the units is only a logical function division. In actual implementation, the units may be divided in other manners. For example, multiple units or components may be combined or may be integrated into another system, or some features can be omitted or not executed. In addition, the coupling or direct coupling or communication connection shown or discussed may be an indirect coupling or communication connection through some interfaces, the indirect coupling or communication connection between devices or units may be electrical, mechanical or other types of coupling or connection.

The units described as separate components may be or may not be physically separated, and the components displayed as units may be or may not be physical units, that is, the components may be located in one place, or may be distributed across multiple network units. Some or all of the units may be selected according to actual needs to achieve the purpose of the solutions of the embodiments.

In addition, individual functional units in each embodiment of the present disclosure may be integrated into one processing unit, or individual units may exist physically separately, or two or more units may be integrated into one unit.

If the functions are implemented in the form of software functional units and sold or used as a standalone product, the product may be stored in a computer readable storage medium. Based on such understanding, the parts of the technical solutions of the present disclosure, which are essential or contribute over related arts, may be embodied in the form of a software product stored in a storage medium. The computer software product include instructions to cause a computer device (which may be a personal computer, a server, or a network device, etc.) to perform all or part of the steps of the methods described in various embodiments of the present disclosure. The foregoing storage medium includes: a U disk, a mobile hard disk, a read-only memory (ROM), a random access memory (RAM), a magnetic disk, or an optical disk, or other medium which can store program codes.

The foregoing is only exemplary embodiments of the present disclosure, but the scope of the present disclosure is not limited thereto, and any person skilled in the art can easily think of changes or substitutions and such changes or substitutions fall within the technical scope of the present disclosure. Therefore, the scope of protection of the present disclosure should be defined by the appended claims.

What is claimed is:

1. A method for managing a link, comprising:
   receiving, by a first network device, a first link quality parameter sent by a second network device, wherein the first link quality parameter is used to indicate a link quality between a terminal device and the second network device, and the first network device provides a current service for the terminal device, and the first link quality parameter is sent by the second network device if there is no connection between the terminal device and the second network device and the first link quality parameter is greater than a threshold value; and
   determining, by the first network device, whether a connection between the terminal device and the second network device is needed according to the first link quality parameter;
   if it is determined that the connection between the terminal device and the second network device is needed, and there is no connection between the terminal device and the second network device, establishing, by the first network device, the connection between the terminal device and the second network device.

2. The method according to claim 1, wherein before determining, by the first network device, whether the connection between the terminal device and the second network device is needed according to the first link quality parameter, the method further comprises:
   obtaining, by the first network device, a second link quality parameter, wherein the second link quality parameter is used to indicate a link quality between the terminal device and the first network device;
   determining, by the first network device, whether a connection between the terminal device and the second network device is needed according to the first link quality parameter, comprises:
   determining, by the first network device, whether the connection between the terminal device and the second network device is needed according to the first link quality parameter and the second link quality parameter.

3. The method according to claim 2, wherein determining, by the first network device, whether the connection between the terminal device and the second network device is needed according to the first link quality parameter and the second link quality parameter, comprises one of the following:
   if the first link quality parameter is greater than a first threshold value, and the second link quality parameter is smaller than a second threshold value, determining, by the first network device, that the connection between the terminal device and the second network device is needed;
   if the first link quality parameter is greater than a sum of the second link quality parameter and a third threshold value, determining, by the first network device, that the connection between the terminal device and the second network device is needed; and
   if the first link quality parameter is smaller than a fourth threshold value, and the second link quality parameter is greater than a fifth threshold value, determining, by the first network device, that the connection between the terminal device and the second network device is not needed.

4. The method according to claim 1, wherein establishing, by the first network device, the connection between the terminal device and the second network device, comprises:
   adding, by the first network device, the connection between the terminal device and the second network device as an auxiliary connection of a link of the terminal device according to the first link quality parameter.

5. The method according to claim 1, wherein establishing, by the first network device, the connection between the terminal device and the second network device, comprises:

switching, by the first network device, a link of the terminal device to the second network device according to the first link quality parameter.

6. The method according to claim 1, wherein after determining whether the connection between the terminal device and the second network device is needed, the method further comprises:
if it is determined that the connection between the terminal device and the second network device is not needed, and there exists a connection between the terminal device and the second network device, deleting, by the first network device, the connection between the terminal device and the second network device.

7. The method according to claim 1, wherein the first link quality parameter is at least one of the following parameters between the terminal device and the second network device:
a signal reception strength, a signal reception quality or a link loss.

8. The method according to claim 1, wherein before receiving, by the first network device, the first link quality parameter sent by the second network device, the method further comprises:
sending, by the first network device, measurement configuration information to the second network device, wherein the measurement configuration information is used to instruct the second network device to measure the link quality between the terminal device and the second network device;
wherein receiving, by the first network device, the first link quality parameter sent by the second network device, comprises:
receiving, by the first network device, a measurement result that is sent by the second network device according to the measurement configuration information, wherein the measurement result carries at least one of:
at least one first link quality parameter of a measured beam, a cell, a network transmission point, frequency point information, and uplink transmission time reference information of the terminal device.

9. The method according to claim 8, wherein the measurement configuration information comprises at least one of:
the measured beam, the network transmission point, the cell, the frequency point information, measurement quantity information, a measurement result reporting condition, a measurement time trigger quantity, a measurement result reporting quantity, a measurement result reporting time interval, and request indication information for instructing the terminal device to send the transmission time reference information, wherein the transmission time reference information is used to indicate time for the terminal device to send data.

10. The method according to claim 1, wherein the method further comprises one of the following:
before receiving, by the first network device, the first link quality parameter sent by the second network device, the method further comprises:
sending, by the first network device, a request message to the second network device, wherein the request message is used to request the second network device to configure a reference signal for the terminal device;
receiving, by the first network device, a configuration parameter of the reference signal sent by the second network device; and
sending, by the first network device, the configuration parameter to the terminal device; and before receiving, by the first network device, the first link quality parameter sent by the second network device, the method further includes:
sending, by the first network device, a configuration parameter of a reference signal of the terminal device to the second network device.

11. The method according to claim 10, wherein the configuration parameter comprises at least one of:
a resource location occupied by transmitted reference signal, a signal codeword, beam information, a network transmission point, and a transmission power for transmitting the reference signal.

12. A method for managing a link, comprising:
determining, by a second network device, a first link quality parameter, wherein the first link quality parameter is used to indicate a link quality between a terminal device and the second network device; and
sending, by the second network device, the first link quality parameter to a first network device, wherein the first network device provides a current service for the terminal device;
wherein the method further comprises:
if it is determined that the connection between the terminal device and the second network device is needed, and there is no connection between the terminal device and the second network device, accepting establishing of the connection between the terminal device and the second network device;
wherein before sending, by the second network device, the first link quality parameter to the first network device, the method further comprises:
determining, by the second network device, whether there is a connection between the terminal device and the second network device;
wherein sending, by the second network device, the first link quality parameter to the first network device, comprises:
if there is no connection between the terminal device and the second network device and the first link quality parameter is greater than a threshold value, sending, by the second network device, the first link quality parameter to the first network device.

13. The method according to claim 12, wherein sending, by the second network device, the first link quality parameter to the first network device, comprises:
periodically sending, by the second network device, the first link quality parameter to the first network device.

14. The method according to claim 12, wherein sending, by the second network device, the first link quality parameter to the first network device, comprises:
if the first link quality parameter continues to be greater than the threshold value in a first time period, sending, by the second network device, the first link quality parameter to the first network device.

15. The method according to claim 12, wherein the method further comprises:
if there is a connection between the terminal device and the second network device, and the first link quality parameter is smaller than another threshold value, sending, by the second network device, the first link quality parameter to the first network device.

16. The method according to claim 15, wherein sending, by the second network device, the first link quality parameter to the first network device, comprises:
if the first link quality parameter continues to be smaller than the another threshold value in a second time period, sending, by the second network device, the first link quality parameter to the first network device.

17. The method according to claim 12, wherein before sending, by the second network device, the first link quality parameter to the first network device, the method further comprises:

receiving, by the second network device, measurement configuration information sent by the first network device, wherein the measurement configuration information is used to instruct the second network device to measure the link quality between the terminal device and the second network device;

wherein sending, by the second network device, the first link quality parameter to the first network device, comprises:

sending, by the second network device, a measurement result to the first network device according to the measurement configuration information, wherein the measurement result carries at least one of:

at least one first link quality parameter of a measured beam, a cell, a network transmission point, and frequency point information, and uplink transmission time reference information of the terminal device.

18. A device for managing a link, comprising:

a processor;

a memory storing instructions executable by the processor;

wherein the processor is configured to:

receive a first link quality parameter sent by a second network device, wherein the first link quality parameter is used to indicate a link quality between a terminal device and the second network device, and the device provides a current service for the terminal device, and the first link quality parameter is sent by the second network device if there is no connection between the terminal device and the second network device and the first link quality parameter is greater than a threshold value; and determine whether a connection between the terminal device and the second network device is needed according to the first link quality parameter;

if it is determined that the connection between the terminal device and the second network device is needed, and there is no connection between the terminal device and the second network device, establish the connection between the terminal device and the second network device.

* * * * *